Nov. 5, 1968  A. P. SCHMIDT  3,409,030
CARWASH REVOLVING SPRAY NOZZLE
Filed Nov. 1, 1966  2 Sheets-Sheet 1

INVENTOR
ANTHONY P. SCHMIDT
BY *Cullen, Sloman, & Cantor*
ATTORNEYS

Nov. 5, 1968 A. P. SCHMIDT 3,409,030
CARWASH REVOLVING SPRAY NOZZLE
Filed Nov. 1, 1966 2 Sheets-Sheet 2
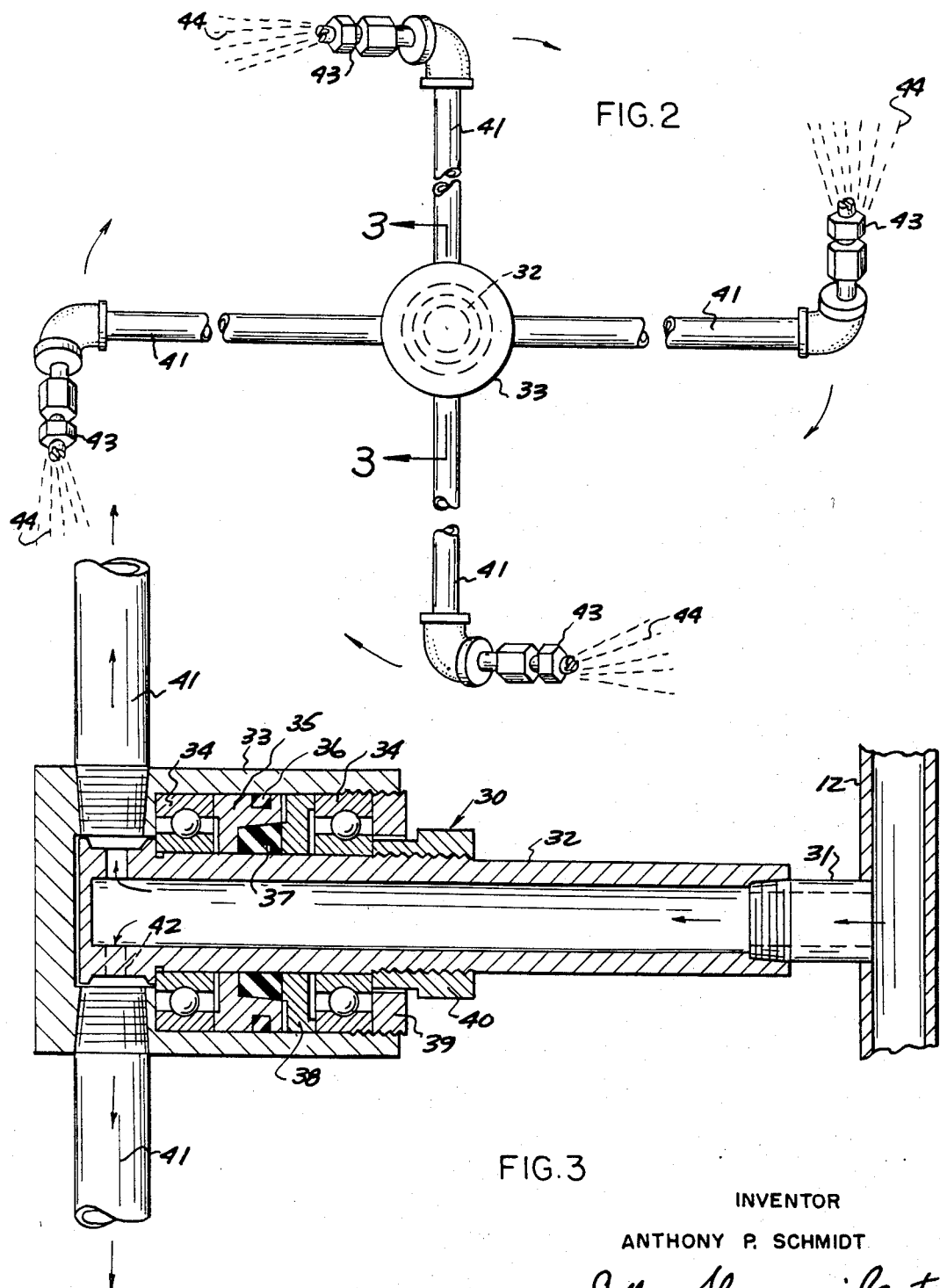
INVENTOR
ANTHONY P. SCHMIDT
BY Cullen, Sloman, & Cantor
ATTORNEYS

United States Patent Office 3,409,030
Patented Nov. 5, 1968

3,409,030
CARWASH REVOLVING SPRAY NOZZLE
Anthony P. Schmidt, 2849 15th Ave.,
Port Huron, Mich. 48060
Filed Nov. 1, 1966, Ser. No. 591,247
1 Claim. (Cl. 134—123)

ABSTRACT OF THE DISCLOSURE

A high pressure wash-spray means for washing automobiles having a sealed bearing member through which liquid passes to a plurality of rotating impulse nozzles.

---

This invention relates to an automatic carwash apparatus, particularly usable for washing automobiles and the like type of vehicles.

Conventional automatic carwash devices generally include various types of brushes for scrubbing and washing the automobile as it passes through the washing apparatus. Hence, such devices require expensive and easily worn out parts, such as brushes, mechanisms for rotating brushes, etc.

Thus, it is an object of this invention to provide an automatic carwash apparatus which, utilizing inexpensive pipes or conduits washes, rinses and thoroughly scrubs the automobile without the need for brushing devices and the like.

A further object of this invention is to provide an automatic carwash apparatus with a spray-type of scrubbing device which, utilizing a relatively high pressure, moving spray, scrubs and washes the dirt off an automobile efficiently, rapidly, and inexpensively.

These and other objects and advantages of this invention will become apparent upon reading the following description, of which the attached drawings form a part.

In these drawings:

FIG. 2 is an end view of a single sprayer unit.

FIG. 3 is an enlarged cross-sectional view taken in the direction of arrows 3—3 of FIG. 2 and illustrates a portion of a sprayer unit.

Figure 1:
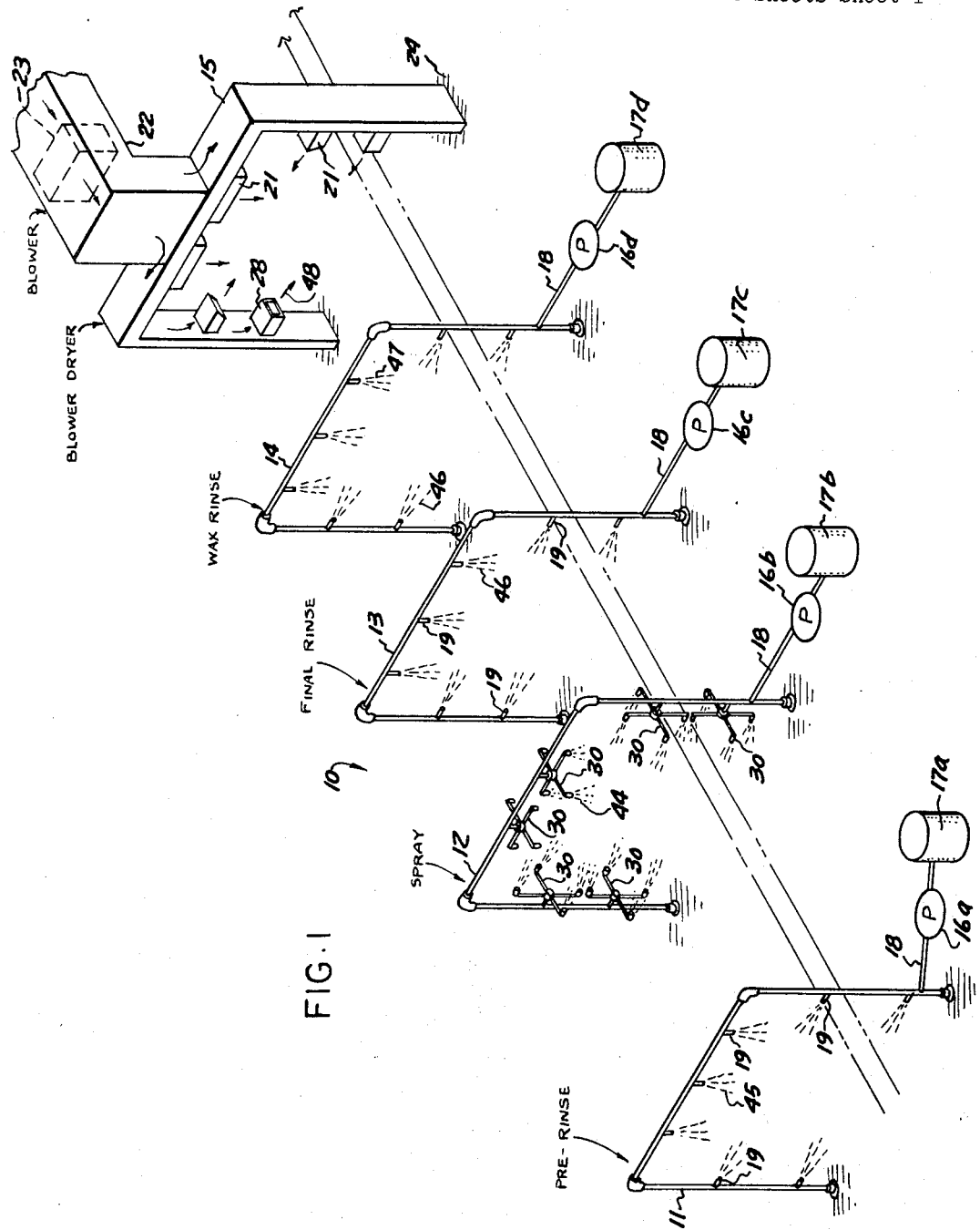
FIG. 1 is a perspective view of the automatic carwash apparatus herein, with certain portions shown schematically.

Referring first to FIG. 1, the automatic carwash apparatus generally designated 10, comprises a pre-rinse conduit 11, a high pressure spray-wash conduit 12, a final rinse conduit 13, a wax applying conduit 14, and a blower or dryer conduit 15.

The conduits 11, 12, 13 and 14, may be simply formed of inverted U-shaped members made of piping and the blower conduit 15 may be formed of sheet metal or the like.

Each of the conduits 11, 12, 13 and 14, are provided with a suitable pump 16a, 16b, 16c, and 16d respectively and also with a suitable liquid reservoir 17a, 17b, 17c and 17d, respectively, each connected by a suitable pipe 18 to its respective conduit.

Inwardly directed spray nozzles 19 are connected to conduits 11, 13 and 14, preferably with at least two nozzles for each leg and base of each conduit, for spraying liquid pumped from its respective reservoir through the conduit pipe and out through the nozzles.

The blower conduit 15 is provided with a number of inwardly directed wide blower nozzles 21 through which air is blown, with the air being taken in through a blower inlet feed nozzle 22 containing a suitable blower 23 which may also include a heater element for heating the air if desired.

As can be seen in FIG. 1, all five conduits are horizontally aligned and spaced apart a sufficient distance and are of a sufficient size to permit the passage of automobiles therethrough. The automobiles may be slowly driven through or may be towed through by means of a suitable conveyor as is conventional in car wash devices. The conduits are all secured to the base or floor 24.

The spray-wash conduit 12, is provided with a number of individual spray units 30, with at least two for each of its legs and base (see FIG. 1).

Referring to FIG. 3, each spray unit 30 includes a short mounting pipe 31, connected to and opening into its conduit 12 on one end and with its opposite end connected to a hollow shaft 32 upon which is rotatably mounted a rotatable bearing housing 33. Bearings 34 separate the housing from the shaft for relative rotation and between the two bearings 34 is located a seal 35 including an outer sealing O-ring 36 and an inner seal member ring 37 held in place by a retainer ring 38.

The bearings are locked in place by means of a bearing lock nut 39 and the unit is held together by means of the jam nut 40.

A number, preferably four, outwardly extending pipes 41, are connected to the bearing housing 33 and communicate, through openings 42 in the shaft 32, to the interior of the shaft. Pipes 41 terminate in suitable spray nozzles 43 out of which a spray 44 is directed.

The nozzles are inwardly directed, approximately in the vertical plane of the conduit 12, but are tilted slightly relative to that plane so that the water spray causes a reaction which in turn rotates the nozzles, pipes 41 and bearing member housing 33. In that way, the spray is cicularly directed and, being of high pressure, scrubs the dirt off the automobile passing beneath it.

In operation, an automobile can be washed by first passing through conduit 11 which provides a spray 45 preferably made up of a suitable mixture of water and soap or detergent which comes from the reservoir 17a. Next, the automobile passes through the conduit 12 whose high pressure, rotating spray units 30, which may spray at approximately 900 p.s.i., provide a spray 44 also made up of water with soap or suitable detergent to thereby scrub and wash off with considerable force, the dirt from the automobile.

Next, the automobile passes through the conduit 13 which preferably provides a clean water spray 46 to final rinse the automobile. If needed, one or more additional conduits 13 may be provided for further rinsing.

Thereafter, the automobile passes though conduit 14 which sprays 46 a mixture of water and liquified wax to lightly apply a film of wax to the automobile surface.

Last, the automobile passes though the blower conduit 15 which blows air upon the automobile, which air may be heated as needed, to dry the liquid and wax so that the automobile exits substantially completely dry.

This invention may be further developed within the scope of the following claim. Accordingly, it is desired that the foregoing description be read as being merely illustrative of an operative embodiment of this invention and not in a strictly limited sense.

Having described an operative embodiment of this invention, I now claim:

1. In an automatic carwash apparatus comprising an inverted U-shaped conduit, arranged in a vertical plane, with the free ends of its legs rigidly supported upon a floor, and of a size to freely pass an automobile and the like horizontally through the U-shape; and having spray units mounted upon each of the two legs and the base of the U-shape; each spray unit comprising a short pipe opening into and extending inwardly of the U-shaped conduit, upon which is mounted a rotatable bearing member, opening into said short pipe, from which a number of nozzle pipes, which open into said bearing member, extend outwardly of the bearing member in a plane normal to said vertical plane, with the free end of each nozzle pipe terminating in a spray nozzle arranged to spray liquid approximately in the direction of said vertical plane inwardly of said U-shape but each nozzle being tilted slightly with respect to said nozzle pipes so that the reaction of said liquid spray will cause said nozzles with their nozzle pipes and bearing member to rapidly rotate together as a single unit upon their short pipe; and having means for supplying cleaning liquid at relatively high pressure to said conduit and thus to said nozzles for providing a rotating high pressure spray from each of said spray units for scrubbing an automobile as it passes through said U-shape; the improvement which comprises a novel bearing and journalling construction for rotatably and in sealing relation supporting and connecting said bearing member (33) on and to said short pipe (31); with said construction including a fixed hollow shaft (32) threadedly connected at one end to said short pipe; and whose other end is closed; and over and outside of which closed end is telescoped a closed end of the bearing member; the bearing member having lateral openings into which are threadedly connected the nozzle pipes; the shaft having lateral ports longitudinally and radially alined with and directly opening into said bearing member openings; and frictionless bearings, sealing rings, a locking nut and a jamb nut between the shaft and the bearing member.

References Cited

UNITED STATES PATENTS

| | | | |
|---|---|---|---|
| 2,660,744 | 12/1953 | Cockrell | 134—123 X |
| 2,862,222 | 12/1958 | Cockrell | 134—123 X |
| 2,922,173 | 1/1960 | Lind et al. | 134—123 X |
| 3,037,223 | 6/1962 | Lovsey. | |

CHARLES A. WILLMUTH, *Primary Examiner.*

JOHN P. McINTOSH, *Assistant Examiner.*